(No Model.)
J. R. CRAVATH.
SEPARABLE RECORDING METER.
No. 593,986. Patented Nov. 23, 1897.
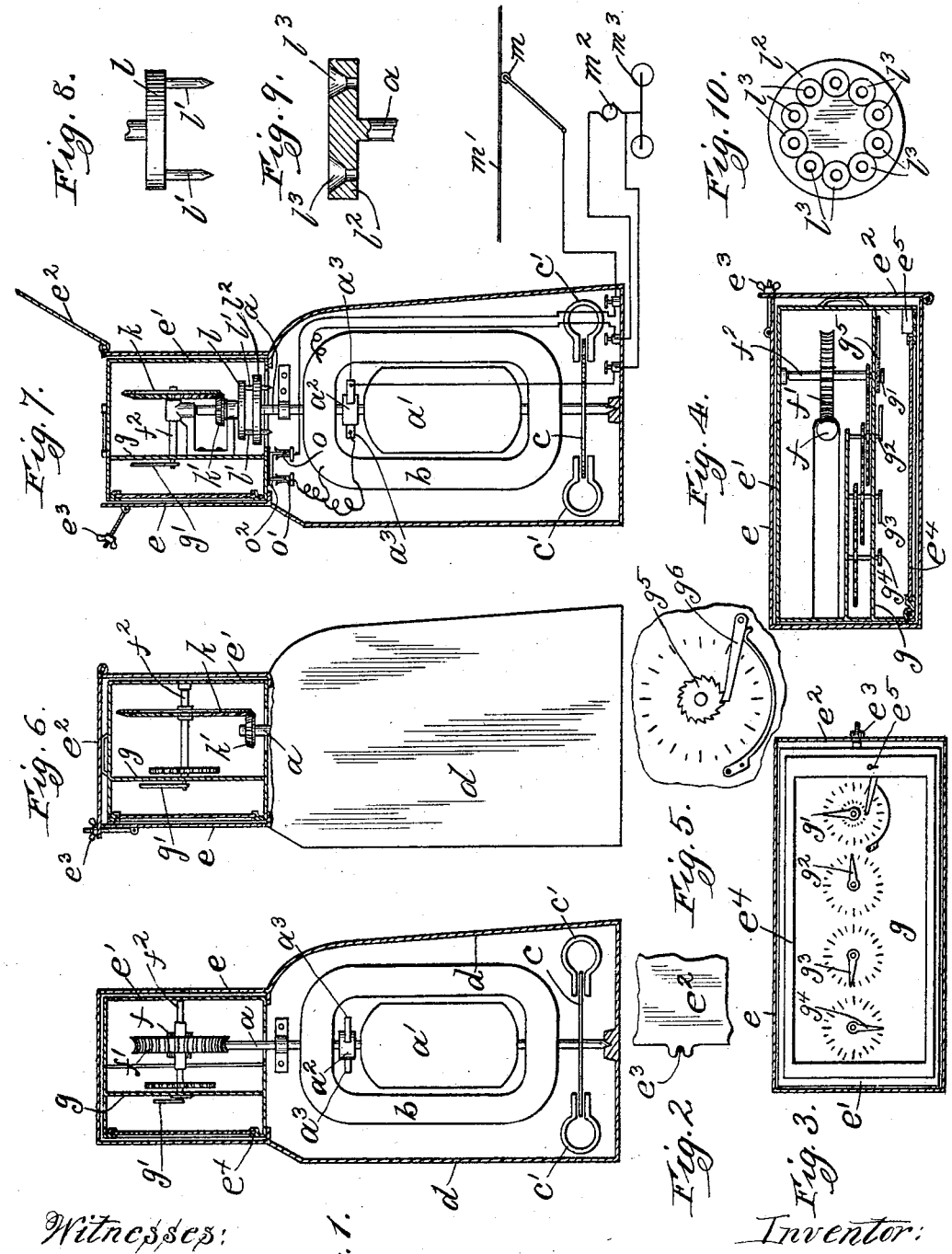
Witnesses:
R. J. Jacker.
J. D. Chubb.
Inventor:
James R. Cravath.
By Ludington + Jones.
Attorneys.
THE NORRIS PETERS CO., PHOTO-LITHO., WASHINGTON, D. C.

UNITED STATES PATENT OFFICE.

JAMES R. CRAVATH, OF CHICAGO, ILLINOIS, ASSIGNOR TO THE CRAVATH MANUFACTURING COMPANY, OF SAME PLACE.

SEPARABLE RECORDING-METER.

SPECIFICATION forming part of Letters Patent No. 593,986, dated November 23, 1897.

Application filed August 12, 1897. Serial No. 647,990. (No model.)

*To all whom it may concern:*

Be it known that I, JAMES R. CRAVATH, a citizen of the United States, residing at Chicago, in the county of Cook and State of Illinois, have invented a certain new and useful Improvement in Separable Recording-Meters, of which the following is a full, clear, concise, and exact description, reference being had to the accompanying drawings, forming a part of this specification.

My invention relates to a separable recording-meter, my object being to provide an improved construction of recording-meter, as a wattmeter or ammeter, whereby the readings thereof may be more readily and conveniently taken.

In certain classes of service, particularly in electric-railway systems, it is desirable to have a large number of meters, the readings of which must be taken at frequent intervals; and it is the purpose of the present invention to so construct the meters that the recording part thereof may be readily removed from the operating part and carried to any desired place for the purpose of reading the record.

My invention is particularly applicable to electric-railway systems. It is often desirable to place upon each motor-car a recording wattmeter or ammeter to keep a record of the amount of power used by each motorman each day in the operation of his car. The labor of going to each car to take the readings requires a large clerical force for this purpose. Furthermore, a reading-clerk must be present at each car when a particular motorman takes charge and again at the end of his run in order to procure the exact reading for that particular motorman. On many roads the cars are run by several crews each day, and in order to keep each motorman's power-record the recording instrument must be read at the time each man begins his run and again when he quits. A large clerical force is thus necessary, and delays result, which render the system of wattmeter-records disadvantageous and oftentimes prohibitive.

In accordance with the invention herein the meters are separably constructed, so that the dial mechanism or other recording mechanism may be detached from the driving or actuating parts of the meter and carried to the office or other place where it is desired to read the records. Thus all of the clerical labor involved may be performed at the office at a time suitable and convenient to the reading-clerk, and one clerk can thus attend to many more motormen than by the method of the prior art. The reading-clerk need not visit the cars at all, and each motorman can go to the office of the reading-clerk before taking charge of his car and there procure a separable dial mechanism for his meter, and upon completing his run or shift can return the dial mechanism to the clerk. In this manner the record of each motorman can be kept without much labor or trouble and at small cost, and a power-recording system thereby rendered practical and efficient. By removing only the dial mechanism of the meter the delicate and nicely-adjusted parts of the driving or actuating mechanism need not be disturbed by handling and consequent jarring and more or less rough usage. I preferably arrange the dial mechanism within a box, which may be readily detached from the driving or actuating mechanism, and preferably provide a casing into which a box carrying the dial mechanism may be placed, the door or covering of the casing being arranged so that it cannot be closed unless the box be inserted completely into position, so that the driving mechanism cannot operate without producing a record. The box may be provided with a door having a lock, whereby no one but the clerk or party holding the key can gain access thereto. The clerk can thus after taking a reading return the pointers to zero and place the dial mechanism in readiness for another record. Where desirable, I associate with the separable recording mechanism an electric switch or pair of terminals or other circuit-controlling means, whereby the circuit through the motor is opened upon the removal of the recording mechanism and is closed upon the insertion of the same into position, whereby the motorman cannot operate his car without first placing the recording mechanism in position. Any attempt to operate the car by short-circuiting the terminals in the absence of the recording mechanism could be readily detected by the inspector upon opening the casing-door, or, where desired, the side of the casing may be cut away or provided with a transparent window, whereby the interior of the casing may be visible.

I will describe my invention in connection with the accompanying drawings, in which—

Figure 1 is a sectional view of a meter embodying my invention. Fig. 2 is a detail view of the locking-clamp. Fig. 3 is a front view of the dial mechanism. Fig. 4 is a plan view thereof. Fig. 5 is a detail view of the ratchet. Fig. 6 is a sectional view of a modification. Fig. 7 is a sectional view of another modification. Figs. 8, 9, and 10 are detail views of the separable gearing of Fig. 7.

Like letters refer to like parts in the several figures.

I have illustrated the actuating or driving mechanism of a wattmeter well known in the art and comprising a vertical shaft $a$, carrying an armature or coil $a'$, and a commutator $a^2$, upon which rest brushes $a^3 a^3$. Surrounding the armature is the field-coil $b$, and upon the shaft $a$ is mounted a copper disk $c$, rotating between the poles of the magnets $c' c'$, to thus form a damper or regulator. These parts are inclosed within a suitable casing $d$, and upon this casing rests the casing $e$ for the reception of the box $e'$, carrying the dial mechanism, which box fits snugly in the casing and may be readily withdrawn therefrom upon opening the door $e^2$, which may be secured, when closed, by a clamping-screw $e^3$ or in other desired manner.

Upon the upper end of the shaft $a$ a worm-screw $f$ is provided, which engages a worm-wheel $f'$ on the shaft $f^2$, extending through the dial-plate $g$ and carrying a pointer or index-finger $g'$, moving over the dial. The shaft $f^2$ is geared with a train of gears in the usual manner for operating the series of pointers or index-fingers $g^2 g^3 g^4$. Upon the removal of the box $e'$ the worm-wheel $f'$ is moved out of engagement with the worm-screw $f$, and upon the insertion of the box the worm-wheel engages and is rotated by the worm-screw, a separable gearing being thus provided. In the side of the box $e'$ is a hinged door $e^4$, provided with a lock $e^5$, whereby access may be had to the interior thereof for resetting the index-fingers. Upon the shaft $f^2$ on the front of the dial a ratchet-wheel $g^5$ may be provided, against which rests a pawl $g^6$ to prevent the dial mechanism from being turned back without opening the door $e^4$.

In Fig. 6 is illustrated a modification of the separable driving-gear. Upon the shaft $f^2$, carrying the first index-finger, is provided a bevel gear-wheel $k$, which meshes with a bevel-pinion $k'$, carried upon the end of the armature-shaft $a$. The door to the casing $e$ is provided at the top, whereby the box carrying the dial mechanism may be removed and the bevel gear-wheels separated.

In Figs. 7, 8, 9, and 10 is illustrated another modification of the separable driving-gear, in which the disk $l$ is mounted on a shaft with the bevel-pinion $k'$ and carries pointed pins $l' l'$, arranged to enter the countersunk holes $l^3 l^3$ in the disk $l^2$, carried upon the upper end of the shaft $a$. Upon raising the box $e'$ the disks are separated, and upon placing the box in position the pins on the upper disk readily enter the holes in the lower disk, thereby locking the shafts to cause the same to rotate together. In Fig. 7 I have also illustrated the circuit connections of the meter as associated with an electric-railway motor, the trolley-wheel $m$ making contact with the trolley-wire $m'$, which is connected, through the field of the meter, through the motor $m^2$, to the truck $m^3$ of the car. The armature of the meter is, as usual, connected across the mains between the trolley and the truck of the car. I have illustrated in connection with the dial-box an electric switch or circuit-controller, whereby the motor-circuit is opened upon the removal of the dial mechanism and is closed upon the replacing of the same in position. In the present instance the circuit-controller comprises a pair of terminals $o o'$, adapted to be closed together through plate $o^2$ on the bottom of the box carrying the dial mechanism when the same is placed in position. Upon the removal of the box the blades on the plate are withdrawn from the terminals and the circuit thereby interrupted. By the term "gearing" as used in the description and claims I have reference to any form of mechanism for transmitting motion from one moving part to another.

Having described my invention, what I claim as new, and desire to secure by Letters Patent, is—

1. The combination with the actuating parts of an electric recording-meter, of recording mechanism separable therefrom, and separable gearing connecting the actuating parts of the meter and the recording mechanism to permit the removal of the recording mechanism for reading, substantially as described.

2. The combination with the actuating parts of an electric recording-meter, of a casing associated therewith, a box carrying the recording mechanism arranged to fit therein, and separable gearing between the actuating parts of the meter and the box carrying the recording mechanism to permit the removal of said box, substantially as described.

3. The combination with the actuating parts of an electric recording-meter, of a casing associated therewith and having a door or covering, a dial-box carrying the recording mechanism arranged to fit within said casing and to permit the closing of the door or covering only when completely in position and separable gearing between the recording mechanism and the actuating parts of the meter to permit the removal of said box, substantially as described.

4. The combination with the actuating parts of an electric recording-meter, of a box carrying the recording mechanism, separable gearing connecting the recording mechanism and the actuating parts of the meter and permitting the removal of said box, and a door or covering upon said box permitting access to the interior thereof, substantially as described.

5. The combination with an electrical translating device, of a meter recording mechanism associated therewith, means for permitting the removal of the recording mechanism for reading, and a circuit-controller for cutting the translating device out of circuit when the recording device is removed, substantially as described.

In witness whereof I have hereunto subscribed my name in the presence of two witnesses.

JAMES R. CRAVATH.

Witnesses:
W. CLYDE JONES,
M. R. ROCHFORD.